Figure 1:
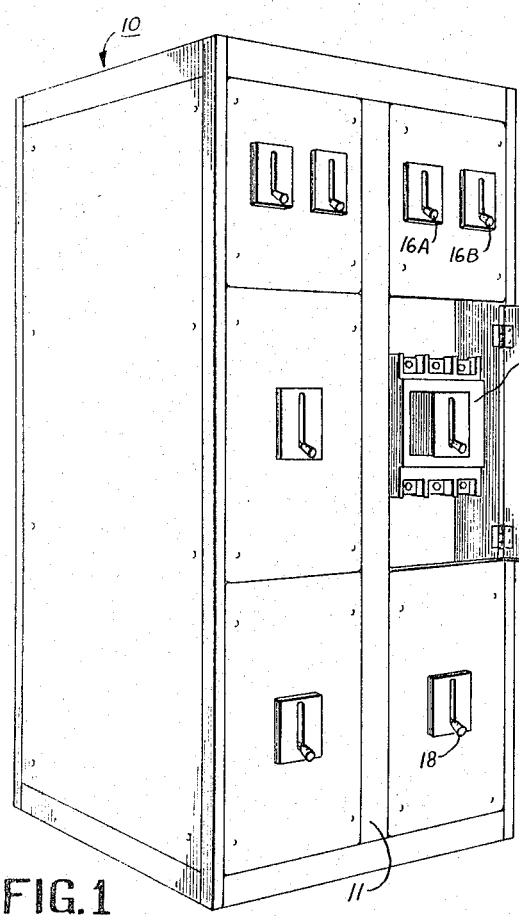

March 7, 1967 W. F. OLASHAW ETAL 3,308,348
SWITCHBOARD WITH SEPARATE LINE AND LOAD MOUNTING BLOCKS
Filed April 12, 1965 3 Sheets-Sheet 1

INVENTORS
WILLIAM F. OLASHAW
NORBERT J. WASILESKI
BY Robert A. Casey
ATTORNEY

March 7, 1967 W. F. OLASHAW ETAL 3,308,348
SWITCHBOARD WITH SEPARATE LINE AND LOAD MOUNTING BLOCKS
Filed April 12, 1965 3 Sheets-Sheet 2

INVENTORS
WILLIAM F. OLASHAW
NORBERT J. WASILESKI
BY Robert H. Casey
ATTORNEY

United States Patent Office 3,308,348
Patented Mar. 7, 1967

3,308,348
SWITCHBOARD WITH SEPARATE LINE AND LOAD MOUNTING BLOCKS
William F. Olashaw, New Britain, and Norbert J. Wasileski, Farmington, Conn., assignors to General Electric Company, a corporation of New York
Filed Apr. 12, 1965, Ser. No. 447,336
6 Claims. (Cl. 317—119)

Our invention relates to an electrical switchboard, and particularly to electrical switchboards of the type including electrical control devices having operating handles accessible from the front of said switchboard and line and load connections both accessible at the back of the switchboard.

Electrical switchboards of the type referred to commonly comprise a metallic framework including means for supporting large electrical control devices such as electrical switches, circuit breakers, current transformers, and so forth. In the type of construction referred to, the control devices are commonly three-pole devices and include three line and three load terminals projecting from the back thereof. The switchboard includes main power supply busbars to which the line connections of the control devices must be connected and load or output terminals connected to outgoing conductors or to other devices within the switchboard, such load terminal connections being accessible only from the back of the switchboard. Since numerous incoming and outgoing conductors are required and since all connections are made from the rear of the switchboard, several basic problems are presented. These problems include minimizing the danger involved in installation and connection of such switchboard, providing adequate electrical clearance between conductors of different polarity or voltage, providing adequate physical support for the conductors, including bracing against high magnetic forces created by a possible short-circuit condition, and facilitating the installation and replacement of electrical control devices.

Since switchboards of the type referred to are commonly used to accommodate a large variety of control devices, a primary problem is to provide the required versatility in the switchboard for accepting devices of different sizes and ratings without the necessity of providing specially formed conductors, special drilling, and so forth, to accommodate such different devices. Thus, for example, such switchboards are ordinarily required to accept devices ranging in size from a given large size which occupies the full width of a given switchboard section to smaller devices of less than half the width of such a switchboard section which may be conveniently mounted in side by side relation rather than in vertically aligned relation.

Prior art switchboard constructions have suffered from disadvantages in one or more of the above areas. Accordingly, it is a general object of the present invention to provide an electrical switchboard construction having increased safety to personnel installing and operating said switchboard.

It is another important object of the invention to provide an electrical switchboard construction which is readily usable without special modification to receive control devices of varying sizes and ratings, including devices occupying the full width of a switchboard section and devices occupying one-half of such width.

It is a particular object of the invention to provide an electrical switchboard construction of the type referred to, i.e., including line and load terminals accessible from the rear of the switchboard, which is of "dead front" construction, that is, which has no electrically energized parts exposed at the front surface thereof when the control devices are removed.

It is another object of the invention to provide an electrical switchboard construction which can be readily adapted to receive electrical control devices by either bolt-in or "plug-in" type connection.

Additional objects of the invention will in part be pointed out, and in part become obvious from the following detailed description of the invention, and its scope will be pointed out in the appended claims.

In accordance with the invention in one form, an electrical switchboard construction is provided including a metallic framework providing a switchboard "cubicle" unit of generally box-like construction. A plurality of specially formed insulating blocks are provided supported on the steel framework. The insulating mounted blocks referred to are of two kinds, each of which performs the dual function of supporting electrical power supply busbars at the back thereof and supporting electrical control devices connecting terminal portions at the front thereof. Thus a first type of insulating block, which will be referred to as "line" insulating blocks, serves to support the power supply conductors at the back thereof and includes isolated connecting compartments at the front thereof in connection with line terminals of a control device. In addition, "load" insulating blocks are provided which also support the power supply busbars at the back thereof, and in addition support at the front thereof connecting means for making connection to load terminals of an electrical control device, and further include means for bringing such load connecting means to a point behind the main power supply busbars for ready connection at a point removed from the main power supply conductors. Each of the insulating mounting blocks further includes means for substantially isolating the aforesaid terminal connection points from accidental contact from the front of the switchboard when the control devices are removed.

In addition, the insulating mounting blocks referred to include forms adapted to support and connect electrical control devices having a width occupying the full width of the aforesaid cubicle and other devices occupying only half said width, two of which devices may be mounted in side-by-side relation.

Figure 2:
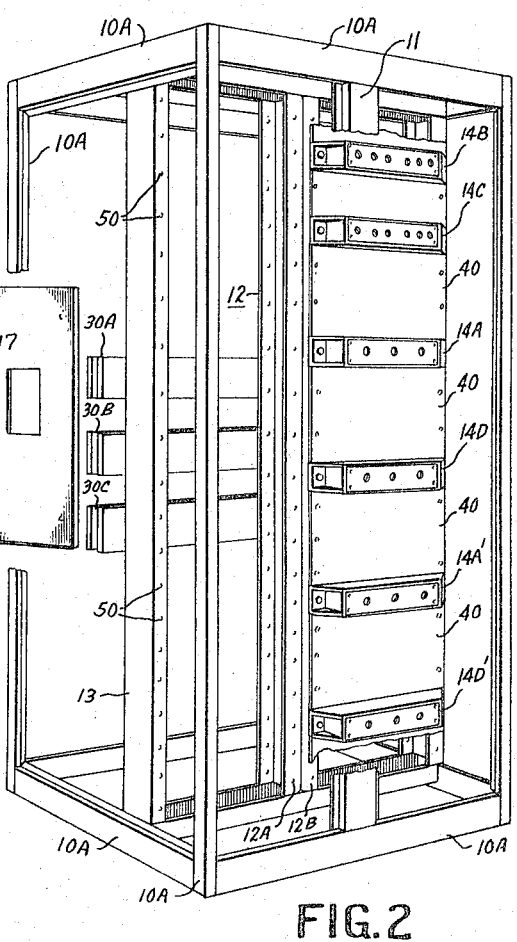
Figure 3:
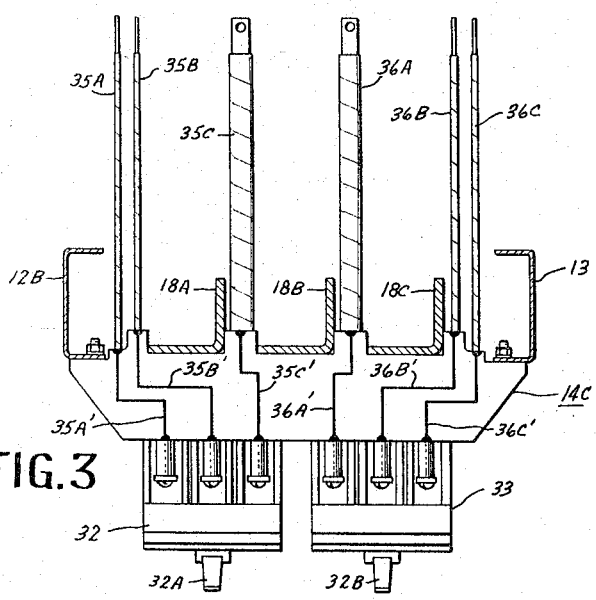
Figure 4:
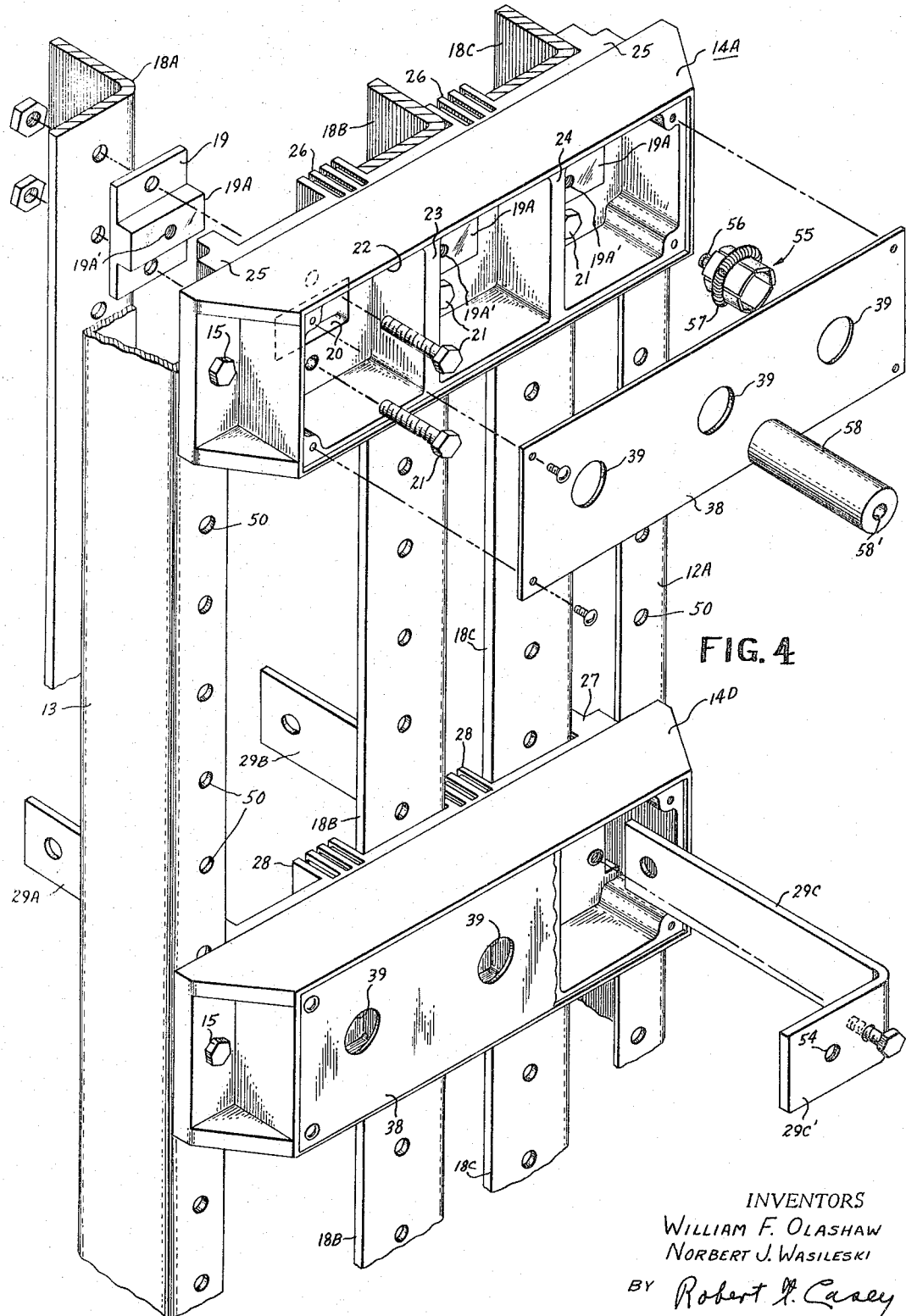

In the drawings,
FIGURE 1 is a perspective view of an electrical switchboard unit constructed in accordance with the invention;
FIGURE 2 is a perspective view of the switchboard unit of FIGURE 1, with the electrical control devices removed and certain portions of the switchboard removed;
FIGURE 3 is a sectional view of a "double" load mounting block in accordance with the invention;
FIGURE 4 is an exploded perspective view of a portion of the switchboard of FIGURE 1, showing particularly the insulating mounting blocks and method of supporting the main power supply busbars, and
FIGURE 5 is a vertical section view of a switchboard of the type shown in FIGURE 1.

Referring to FIGURE 1, the invention is shown as incorporated in an electrical switchboard unit 10 comprising a box-like chamber or cubicle formed of steel framework construction comprising metallic struts or beams 10A, as shown more particularly in FIGURE 2. The cubicle 10 is divided vertically into two switchboard sections by a vertical dividing strut 11 at the front, and a corresponding vertical support strut 12 at an intermediate point (see FIGURE 2). The dividing member 12 is generally of I-beam construction comprising two back-to-back channel-shaped members 12A and 12B. Corresponding vertical support structural members 13, only one shown in FIGURE 2, are also provided spaced laterally from the member 12 intermediate the front and back of the switchboard cubicle.

A plurality of generally rectangular elongated insulating mounting blocks are provided. The insulating mounting blocks referred to are of various types, but all have the same general configuration and external dimensions. For convenience of identification, the insulating mounting blocks will be referred to as (a) "single" line mounting blocks, (b) "single" load mounting blocks, (c) "double" line mounting blocks, and (d) "double" load mounting blocks.

Figure 5:
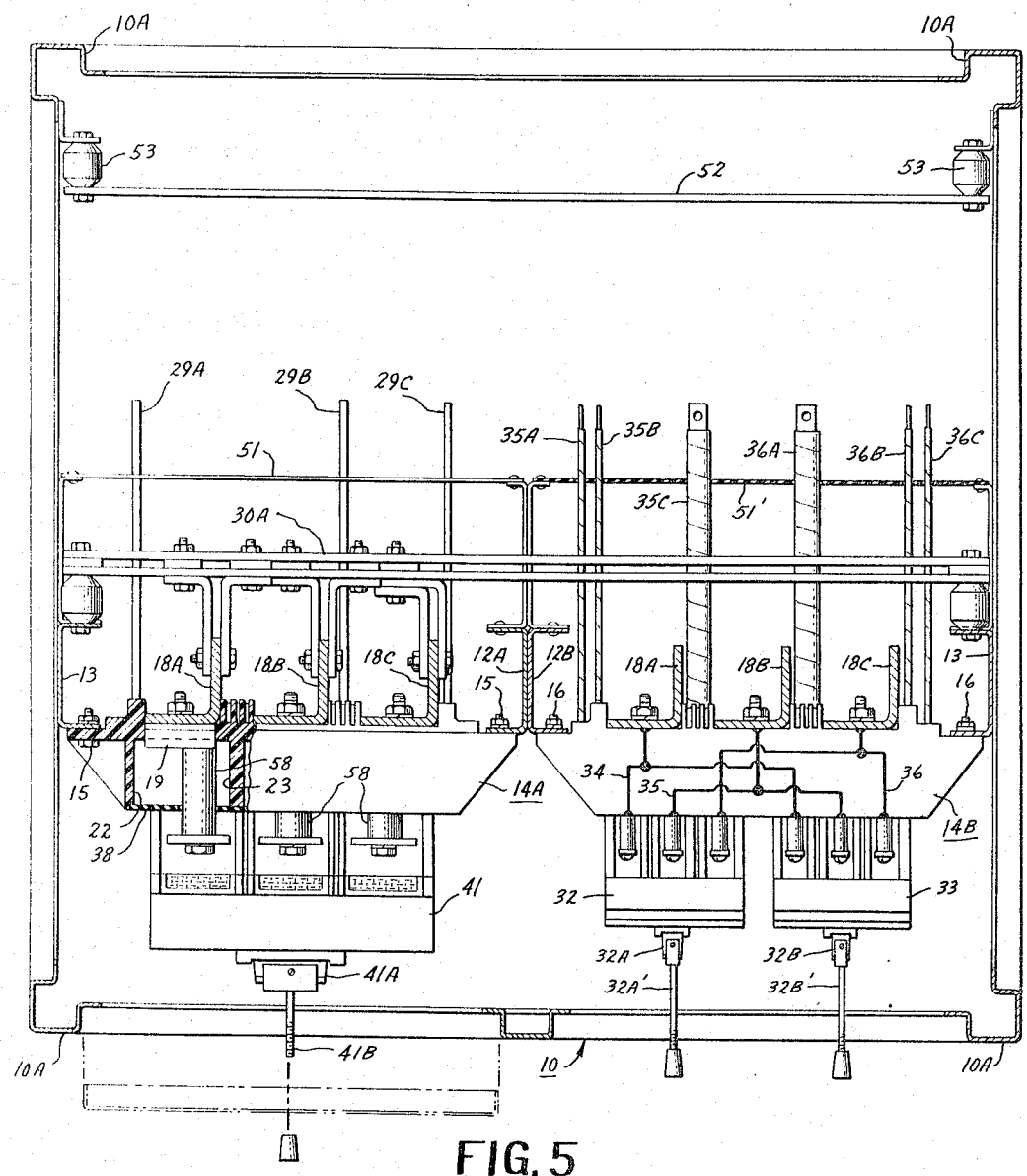

The method of supporting the insulating blocks referred to is illustrated particularly in FIGURES 4 and 5. In FIGURE 5, a "single" line mounting block 14A is shown in the left hand section, and a "double" line mounting block 14B is shown in the right hand section. As shown, the mounting block 14A is supported by suitable means, such as by bolting by means of bolts 15, to the structural member 13 at one end and to the structural member 12A at the other end. Similarly, the mounting block 14B is supported by suitable means, such as by bolting by means of bolts 16, to the structural member 12B at one end and to the structural member 13 at the other end.

The insulating mounting blocks are spaced vertically in accordance with the dimensions of the control devices to be supported, as shown particularly in FIGURE 2. In this figure, mounting blocks 14B and 14C are shown for mounting a pair of electrical control devices whose operating handles are indicated at 16A and 16B in FIGURE 1. Likewise, mounting blocks 14A and 14D are provided for mounting and connecting an electrical control device as shown at 17 in FIGURE 1. Also, mounting blocks 14A′ and 14D′ are provided for mounting and connecting an electrical control device whose operating handle is shown at 18 in FIGURE 1. Referring particularly to FIGURE 4, the mounting blocks 14A and 14D are shown supported at their opposite ends by bolts 15 on the structural supporting members 13 and 12A respectively. Main power supply busbars 18A, 18B, and 18C are supported on the insulating blocks 14A and 14D. As shown in connection with the busbar 18A, each of the busbars is supported on each line insulating block 14A by means of a connecting block 19 having a raised boss portion 19A extending into an opening 20 in the insulating block 14A, by means of bolts 21. The boss 19A therefore provides a connecting surface available within the chamber 22 of the insulating block 14A defined by integral walls 23. The busbars 18A, 18B, 18C, are also rigidly supported against lateral movement by raised boss portions 25, 26 at the back surface of the insulating block 14A.

The busbars 18A, 18B and 18C are not connected to the "load" insulating block 14D, but they are supported against lateral movement by corresponding boss portions 27, 28 of this block.

The "load" insulating block 14D, in addition to providing lateral support for the busbars 18A, 18B and 18C, include means for making "load" connection to the control device to be mounted thereon. This means comprises load connecting straps 29A, 29B and 29C as shown in FIGURE 4. The load connecting straps 29A, 29B and 29C extend at one side of and between the power supply busbars 18A, 18B and 18C, and, as shown particularly in FIGURE 5, the load connecting straps extend beyond the horizontal power supply busbars 30A, 30B, 30C.

For the purpose of mounting and connecting electrical control devices such as 32, 33, shown in FIGURE 5 which are of smaller transverse dimension, "double" line and load mounting blocks 14B, 14C, are provided. Referring to FIGURE 5, a "double" line connecting block is illustrated for mounting the control devices 32, 33. The insulating block 14B includes recesses and barriers supporting and insulating connecting conductors indicated generally at 34, 35, 36 for connecting the line terminals of the devices 32, 33 to the busbars 18A, 18B, 18C. Referring to FIGURE 3, the "double" load connecting block 14C includes connecting means 35A, 35B, 35C, and 36A, 36B, 36C for making load connections to the devices 32, 33 at a point beyond the horizontal power supply conductors 30A, 30B, 30C. The block 14C also includes conducting straps 35A′, 35B′, 35C′ and 36A′, 36B′ and 36C′ seated in conforming recesses.

For the purpose of providing a completely "deadfront" construction, the insulating mounting blocks 14A, 14B, 14C, 14D, include insulating barrier plates 38, having holes 39 therein affording restricted access to the connecting points within the blocks respectively. In addition, insulating barrier sheets 40 are provided, see FIGURE 2, preventing accidental contact with the power supply conductors 18A, 18B, 18C from the front of the switchboard assembly.

The insulating mounting blocks 14A, 14B, etc., are mounted at a predetermined level within the switchboard as determined by the structural members 13, 12A, 12B, and their operating handles such as 32A, 32B, 41A provided with handle extensions comprising elongated rod members 32A′, 32B′, and 41B′ respectively, as shown in FIGURE 5.

In FIGURE 3 there is shown a "double" load mounting block 14C, shown in mounted condition supported on the structural members 12B and 13. As shown in this figure, the vertical busbars 18A, 18B, 18C are not connected to the mounting block 14C, but they are positioned thereby laterally by formations or bosses at the back of the unit 14C.

The mounting block 14C supports the load ends of the control devices 32, 33, the line ends of which are supported by the block 14B shown in FIGURE 5. The load terminals of the devices 32, 33 are connected by suitable conducting straps 35A′, 35B′, 35C′ and 36A′, 36B′, and 36C′ seated within conforming recesses in the insulating block 14C, to the projecting conducting straps 35A, 35B, 35C and 36A, 36B, 36C respectively. It will be observed that the straps 35A, 35B, 35C and the straps 36A, 36B, 36C are insulated and by-pass the vertical busbars 18A, 18B, 18C, and that the end portions thereof are available for connection from behind the switchboard at a point well removed from the vertical busbars 18A, 18B, 18C as well as from the horizontal feeding busbars 30A, 30B, 30C.

The structural members 12 and 13 are provided with mounting holes 50, see FIGURE 2, which are equally spaced at predetermined locations such that they determine the position of the mounting blocks such as 14C having load straps projecting at the back thereof to assure that the load straps always come through at points which do not interfere with the horizontal busbars 30A, 30B, 30C, thus avoiding any "dead" or unusable areas. The exposed end portions of the straps 35A, 35B, 35C, etc. are also preferably shielded from the vertical busbars 18A, 18B, 18C and the horizontal busbars 30A, 30B, 30C by a suitable insulating plate such as 51, 51′, see FIGURE 5.

A neutral bar 52 is supported at the back of the switchboard cubicle in insulated relation to the frame members by suitable insulating spacers 53.

It will be observed that a switchboard is provided which has a "dead-front" construction, that is, no live conducting parts are substantially exposed from the front of the switchboard when the control devices are removed (see FIGURE 2) as well as a "dead-back" construction, in which no live connections or busbars are exposed (see FIGURE 5). In addition, the construction affords a high degree of versatility in accepting devices of varying sizes and types of mounting. Thus, as shown in FIGURE 4, the devices may be connected by bolting type connection as that afforded by strap 29C having a bent-over end portion 29C′ with a tapped hole 54 for receiving a connecting bolt. On the other hand, a plug-in type connection may also be used, as shown at 55 in FIGURE 4, comprising a threaded stud 56 having a plurality of resiliently biased connecting fingers held is assembled relation by the toroidal spring 57.

For the purpose of facilitating the making of a bolted type connection to the surfaces 19A and 29C, cylindrical conductive members 58 are provided, which are inserted through the holes 39 and contact the surfaces referred to. A connecting bolt extending through the terminal of the control device to be mounted also extends through the hole 58' of the spacer member 58 and threads into the tapped hole 19A' or 54.

The main power supply busbars 18A, 18B, 18C, are preferably made of right-angle cross-section as shown. This construction minimizes the lateral and depth-wise space required for the main busbars. In addition, it substantially increases the strength of these conductors against deformation by short-circuit forces or otherwise. Moreover, this shape facilitates the making of connections to a given bar by two other bars at the same vertical level.

While the invention has been described in connection with one particular embodiment, it will be observed that many modifications and variations may be made without departing from the spirit and scope of the invention and it is therefore intended by the appended claims to cover all such modifications as fall within the true spirit and scope of the invention.

What we claim as new and desire to secure by Letters Patent of the United States is:

1. An electrical switchboard construction comprising:
   (a) a structural framework including a pair of elongated structural support members, means supporting said structural support members in generally parallel spaced relation;
   (b) a plurality of elongated generally rectangular insulating mounting blocks having front and back surfaces, each of said mounting blocks having one end thereof supported on one of said support members and the other end thereof supported on the other of said support members, said mounting blocks being mounted in spaced relation lengthwise of said support members;
   (c) a plurality of power supply busbars extending parallel to and between said support members, said power supply busbars being connected to at least some of said mounting blocks, said mounting blocks including integral formations at said back surface thereof positioning said power supply busbars against movement in a direction transverse to their length;
   (d) said mounting blocks including means at said front surfaces thereof for supporting and connecting electrical control devices, and
   (e) at least some of said mounting blocks including conductor means extending from the back thereof to a point substantially removed from said power supply busbars and having means at the front thereof for connecting said conductor means to electrical control devices mounted on said blocks.

2. An electrical switchboard construction as set forth in claim 1 wherein said switchboard also includes insulating sheet barrier means extending between said structural support members in the space between adjacent ones of said mounting blocks and shielding said power supply busbars from accidental contact from the front of said switchboard when said control devices are removed.

3. An electrical switchboard construction comprising:
   (a) a metallic framework defining a generally rectangular switchboard cubicle having a vertical front front wall and a vertical back wall and opposed side walls extending generally perpendicular thereto;
   (b) at least two elongated structural support members extending between said bottom wall and said top wall within said cubicle and spaced from said front and back walls, said structural members being spaced apart in the direction between said side walls;
   (c) a plurality of elongated insulating mounting blocks each having one end thereof supported on one of said structural support members and the other end thereof supported on the other of said structural support members, said mounting blocks being spaced apart at predetermined distances in the direction between said top and bottom walls;
   (d) a plurality of vertical power supply busbars extending parallel to said structural support members at the back of said insulating mounting blocks;
   (e) said mounting blocks comprising a plurality of pairs of mounting blocks, each of said pairs comprising a line mounting block and a load mounting block;
   (f) said vertical busbars being supported on and connected to said line mounting blocks, said load mounting blocks including integral boss portions extending closely adjacent said vertical busbars and supporting said vertical busbars against movement transversely thereof;
   (g) said line mounting blocks including means for supporting and connecting a line end of an electrical control device, said load mounting blocks including means for supporting and connecting a load end of an electrical control device;
   (h) said load mounting blocks including conductive strap means extending from the back thereof beyond said vertical power supply busbars and having at least the end portions thereof exposed for connection from the back of said switchboard, and
   (i) insulating barrier means extending between said structural support members at the front of said vertical power supply busbars and in the space between adjacent insulating mounting blocks whereby an essentially "dead-front" construction is provided having no energized conducting parts exposed for ready contact from the front of said switchboard.

4. An electrical switchboard construction comprising:
   (a) a generally rectangular box-like switchboard cubicle having a top and bottom wall, front and back walls, and opposed side walls extending generally perpendicular to said front and back walls;
   (b) at least one pair of elongated structural support members extending between said top and bottom walls parallel to said side walls and spaced apart from each other in a plane parallel to said front wall;
   (c) a plurality of elongated generally rectangular insulating mounting blocks, each of said mounting blocks having one end thereof supported on one of said structural support members and the other end thereof supported on the other of said structural support members, said insulating mounting blocks comprising a plurality of pairs of mounting blocks, each of said pairs including a line mounting block and a load mounting block, each of said load mounting blocks being supported in predetermined spaced relation vertically of said switchboard adjacent a corresponding line mounting block to receive and support an electrical control device therebetween;
   (d) a plurality of power supply busbars extending parallel to and in the space between said structural support members at the back of said insulating mounting blocks;
   (e) means connecting each of said power supply busbars to each of said line mounting blocks, each of said load mounting blocks including integral boss means extending closely adjacent said power supply busbars and supporting said busbars against transverse movement;
   (f) insulating barrier means extending between said structural support members in the space between adjacent mounting blocks at the side of said busbars adjacent said front wall;
   (g) said load mounting blocks including insulated conductive strap means extending from the back thereof toward said back wall of said cubicle to a point substantially spaced away from said power supply busbars, said conductor straps having the end portions thereof exposed for connection and accessible from said back wall of said cubicle.

5. An electric switchboard construction as set forth in claim 4 wherein said insulating blocks include recesses therein corresponding to each of the terminal means of said control devices supported thereby and insulating cover means over said recesses having a restricted access opening leading to said terminal means, whereby an essentially dead-front construction is provided having no energized conductive parts exposed for contact from the front of said switchboard when said control devices are removed.

6. An electrical switchboard construction as set forth in claim 4 wherein said construction also includes insulating barrier means extending between said side walls behind said power supply busbars and having openings therein through which said conducting load straps project and providing a barrier between said exposed end portions and said power supply busbars.

References Cited by the Examiner

UNITED STATES PATENTS 2,441,485   5/1948   Graves et al. _____ 317—119
3,211,960   10/1965  Dorfman et al. _____ 317—119

ROBERT K. SCHAEFER, *Primary Examiner.*

W. C. GARVERT, *Assistant Examiner.*